(12) United States Patent
Kunimochi et al.

(10) Patent No.: US 6,955,453 B2
(45) Date of Patent: Oct. 18, 2005

(54) SPREAD ILLUMINATING APPARATUS WITH LIGHT SCATTERING MEANS

(75) Inventors: Toru Kunimochi, Iwata-gun (JP); Satoshi Kawashima, Iwata-gun (JP); Kazutoshi Takayanagi, Iwata-gun (JP); Shun Kurebayashi, Iwata-gun (JP)

(73) Assignee: Minebea Co., Ltd., Nagano (JP)

( * ) Notice: Subject to any disclaimer, the term of this patent is extended or adjusted under 35 U.S.C. 154(b) by 19 days.

(21) Appl. No.: 10/690,642

(22) Filed: Oct. 23, 2003

(65) Prior Publication Data

US 2004/0120139 A1 Jun. 24, 2004

(30) Foreign Application Priority Data

Dec. 19, 2002 (JP) ........................................ 2002-368805

(51) Int. Cl.[7] ................................................. F21V 5/00
(52) U.S. Cl. ........................ 362/333; 362/31; 362/555
(58) Field of Search .......................... 362/31, 555, 330, 362/333, 800

(56) References Cited

U.S. PATENT DOCUMENTS 5,854,872 A * 12/1998 Tai .............................. 385/133
6,827,456 B2 * 12/2004 Parker et al. ................. 362/31
2004/0246697 A1 * 12/2004 Yamashita et al. ............ 362/31

FOREIGN PATENT DOCUMENTS

| JP | A 10-293202 | 11/1998 |
|---|---|---|
| JP | A 11-287993 | 10/1999 |

* cited by examiner

Primary Examiner—Ali Alavi
(74) Attorney, Agent, or Firm—Oliff & Berridge, PLC (57) ABSTRACT

In a spread illuminating apparatus comprising a light conductive plate, and at least one spot-like light source disposed close to a light entrance surface thereof, the light conductive plate has, on its light exit surface, a light scattering means comprising a plurality of mechanisms which are each formed so as to extend in a direction perpendicular to the light entrance surface, and which are adapted to scatter the light emitted from the at least one spot-like light source with respect to the direction parallel to the light entrance surface. The mechanisms of the light scattering means each consist of either paired slanting surfaces, a ridge with its surface arced in cross section, or a ridge multifaceted forming a polygonal cross section. The surfaces of the mechanisms may be roughened with a plurality of grooves, thereby achieving a further uniform illumination.

13 Claims, 6 Drawing Sheets

SPREAD ILLUMINATING APPARATUS WITH LIGHT SCATTERING MEANS

BACKGROUND OF THE INVENTION

1. Field of the Invention

The present invention relates to a spread illuminating apparatus for a liquid crystal display, and more particularly to a spread illuminating apparatus adapted for irradiating light emitted from a spot-like light source on a screen of a liquid crystal display.

2. Description of the Related Art

In recent years, a spread illuminating apparatus of side light system, which has a light source disposed on a side surface of its light conductive plate, has been often used as an auxiliary apparatus for a light crystal display (hereinafter referred to as LCD). In this type of spread illuminating apparatus, a linear light source, such as a fluorescent lamp, having a length substantially equal to the width of the light conductive plate is used as a light source thereby uniformly illuminating the entire light conductive plate.

In an apparatus, such as a cellular phone, which requires reduced power consumption, a light emitting diode (hereinafter referred to as LED) must be used as a light source. However, when the LED is used, there arises a question about luminance uniformity over the light conductive plate. The question is addressed as described below, and uniformity with no practical problem is achieved (refer to Japanese Patent Publication No. H10-293202). The light entrance surface of a light conductive plate, which has LEDs disposed thereat, is serrated thus forming a series of prisms in order to spread light emitted from the LEDs in the across-the-width direction of the light conductive plate. The question is also addressed such that an optical path conversion means comprising, for example, a dotty roughened surface is provided on the bottom surface of the light conductive plate to thereby allow light introduced into the light conductive plate through the entrance surface to exit out through the exit surface. And, in some cases, a diffuser plate may be provided between the light conductive plate and the LCD to further improve the uniformity.

Since not only reduction in power consumption but also a higher luminance is increasingly required in the spread illuminating apparatus, there is a demand for an efficient use of light emitted from the LEDs. To meet the demand, it is considered to narrow the view field angle of light exiting out from the light conductive plate thereby achieving a higher luminance. Specifically, it is considered to provide, on the bottom surface of the light conductive plate, a plurality of prisms (constituting a reflection planes) adapted to reflect light while maintaining its directivity, in place of the above-mentioned dotty roughened surface constituting an optical path conversion means.

Figure 5:
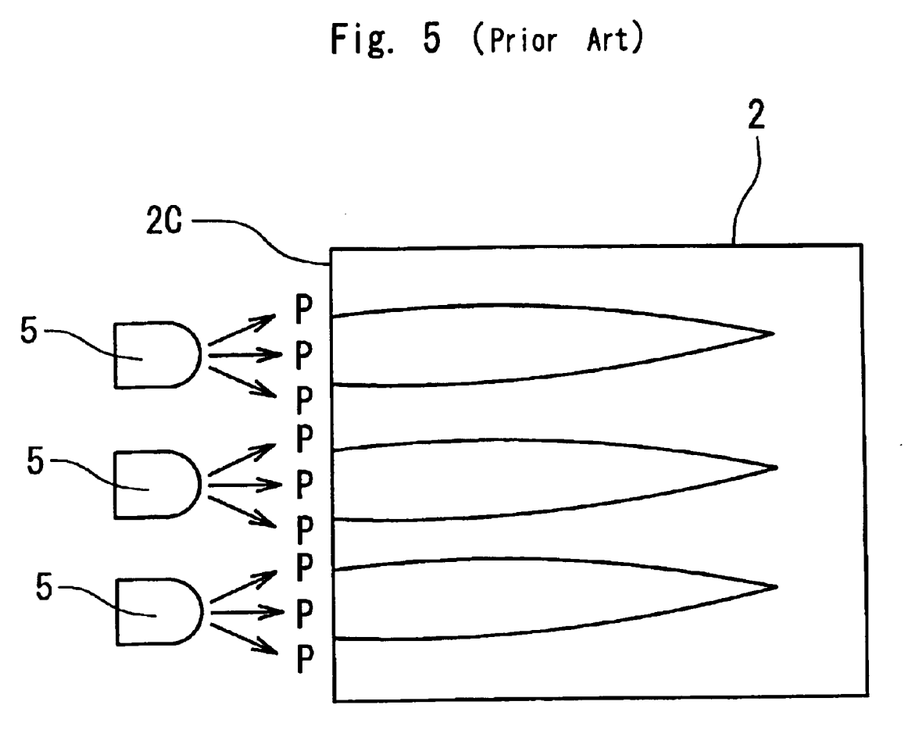
FIG. 5 is an explanatory view of light propagation through a light conductive plate of a conventional spread illuminating apparatus using spot-like light sources.

However, when light emitted from the LEDs is incident on the light conductive plate which has the prisms formed on its bottom surface so as to extend in parallel to the entrance surface, the following problem occurs. As shown in FIG. 5, only light rays, that are emitted from LEDs and propagate in a direction perpendicular to an entrance surface 2C of a light conductive plate 2, exit out toward a viewer, resulting in remarkably poor illumination uniformity. This happens because light rays which propagate deviating from the perpendicular direction through the light conductive plate 12 are incident slantingly on the prisms, and therefore their light paths are diverted from a viewer's eye (a direction perpendicular to the exit surface), thus the light rays do not work as effective illuminating light.

Figure 6:
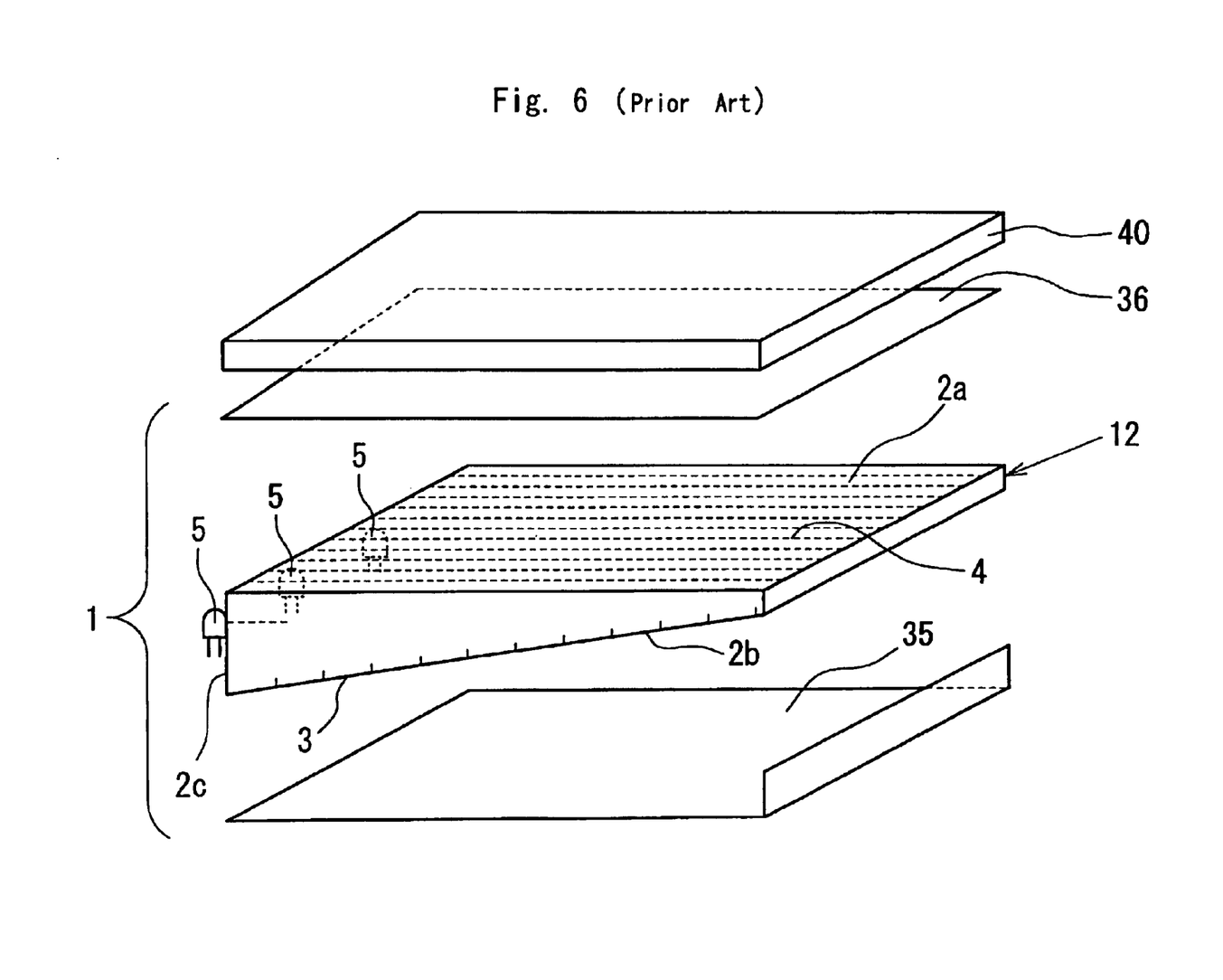
FIG. 6 is an exploded perspective view of a conventional spread illuminating apparatus using spot-like light sources.

A spread illuminating apparatus is disclosed in Japanese Patent Publication No. H11-287993, which is provided to address almost the same problem as mentioned above, though prisms are not used as an optical path conversion means. As shown in FIG. 6, a spread illuminating apparatus 1 disposed under an LCD 40 comprises a diffuser plate 36, a light conductive plate 2, a reflector plate 35, and a plurality of LEDs 5 disposed at an end surface 2c of the light conductive plate 2. The light conductive plate 2 has a diffraction grating 3 as an optical conversion means formed on its bottom surface 2b and has also a diffraction grating 4 formed on its top surface 2a so as to be oriented orthogonal to the diffraction grating 3.

However, a display device using a spot-like light source, such as the above-described LED, is associated with the following problems. In a color display device the light source is required to emit white light, but a practical LED emits monochromatic light. Therefore, it is commonly practiced that a fluorescent material is disposed in front of the LED emitting blue light in order to convert the blue light into white light. In the conventional spread illuminating apparatus disclosed in Japanese Patent Publication No. H11-287993, the diffraction grating is formed on the surface of the light conductive plate in order to uniformly spread light entirely over the surface of the light conductive plate. Since white light is dispersed into spectral light by the diffraction grating, the diffuser plate 36 is required which prevents the surface of the light conductive plate from getting entirely colored due to the spectral light. Also, since the light conductive plate has a grating interval of as minute as a few μm, a transcription technology with a high precision is required.

SUMMARY OF THE INVENTION

The present invention has been made in light of the above problems, and it is an object of the present invention to provide a spread illuminating apparatus which is equipped with a light scattering means adapted to uniformly spread light emitted from a spot-like light source entirely over an LCD.

In order to achieve the above object, according to a first aspect of the present invention, a spread illuminating apparatus generally comprises a light conductive plate, and at least one spot-like light source disposed close to a light entrance surface of the light conductive plate, and light conductive plate has, on its light exit surface, a light scattering means comprising a plurality of mechanisms which are each formed so as to extend in a direction perpendicular to the light entrance surface, are continuously arrayed in a direction parallel to the light entrance surface, and which are adapted to scatter the light emitted from the at least one spot-like light source with respect to the direction parallel to the light entrance surface, and the light conductive plate has, on a surface thereof opposite to the light exit surface, an optical path conversion means comprising a plurality of paired slanting surfaces which are formed so as to extend in the direction parallel to the light entrance surface.

According to a second aspect of the present invention, in the spread illuminating apparatus of the first aspect, the mechanisms of the light scattering means each consist of paired slanting surfaces forming a triangular cross section, and have their respective triangular cross sections defining respective apex angles different from one another.

According to a third aspect of the present invention, in the spread illuminating apparatus of the first aspect, the mechanisms of the light scattering means each consist of a ridge having its surface arced in cross section, and have their respective ridges differing in dimension and defining different maximum tangential angles with respect to an imaginary major plane of the light conductive plate.

According to a fourth aspect of the present invention, in the spread illuminating apparatus of the third aspect, the maximum tangential angles range from 10 to 50 degrees.

According to a fifth aspect of the present invention, In the spread illuminating apparatus of the first aspect, the mechanisms of the light scattering means each consist of a ridge multifaceted so as to form a polygonal cross section, and have their respective ridges differing in dimension and in cross sectional configuration.

According to a sixth aspect of the present invention, in the spread illuminating apparatus of any one of the first to fifth aspects, the mechanisms of the light scattering means have their surfaces roughened with a plurality of grooves each formed so as to extend in the direction perpendicular to the light entrance surface of the light conductive plate.

According to a seventh aspect of the present invention, in the spread illuminating apparatus of the first aspect, the mechanisms of the light scattering means each consist of paired slanting surfaces forming a triangular cross section, and have their respective triangular cross sections defining respective apex angles equal to one another, and the slanting surfaces are roughened with a plurality of grooves each formed so as to extend in the direction perpendicular to the light entrance surface of the light conductive plate.

According to an eighth aspect of the present invention, in the spread illuminating apparatus of the sixth or seventh aspects, the surfaces roughened have an average surface roughness ranging from 0.1 to 1.0 μm.

With the structure described above, light emitted from a spot-like light source can be spread so as to illuminate the display screen entirely in a uniform manner while maintaining a high luminance.

BRIEF DESCRIPTION OF THE DRAWINGS

The above object and other advantages of the present invention will become more apparent by describing in detail the preferred embodiments of the present invention with reference to the attached drawings in which.

DETAILED DESCRIPTION OF THE PREFERED EMBODIMENTS

Preferred embodiments of the present invention will hereinafter be explained with reference to the accompanying drawings.

Figure 1:
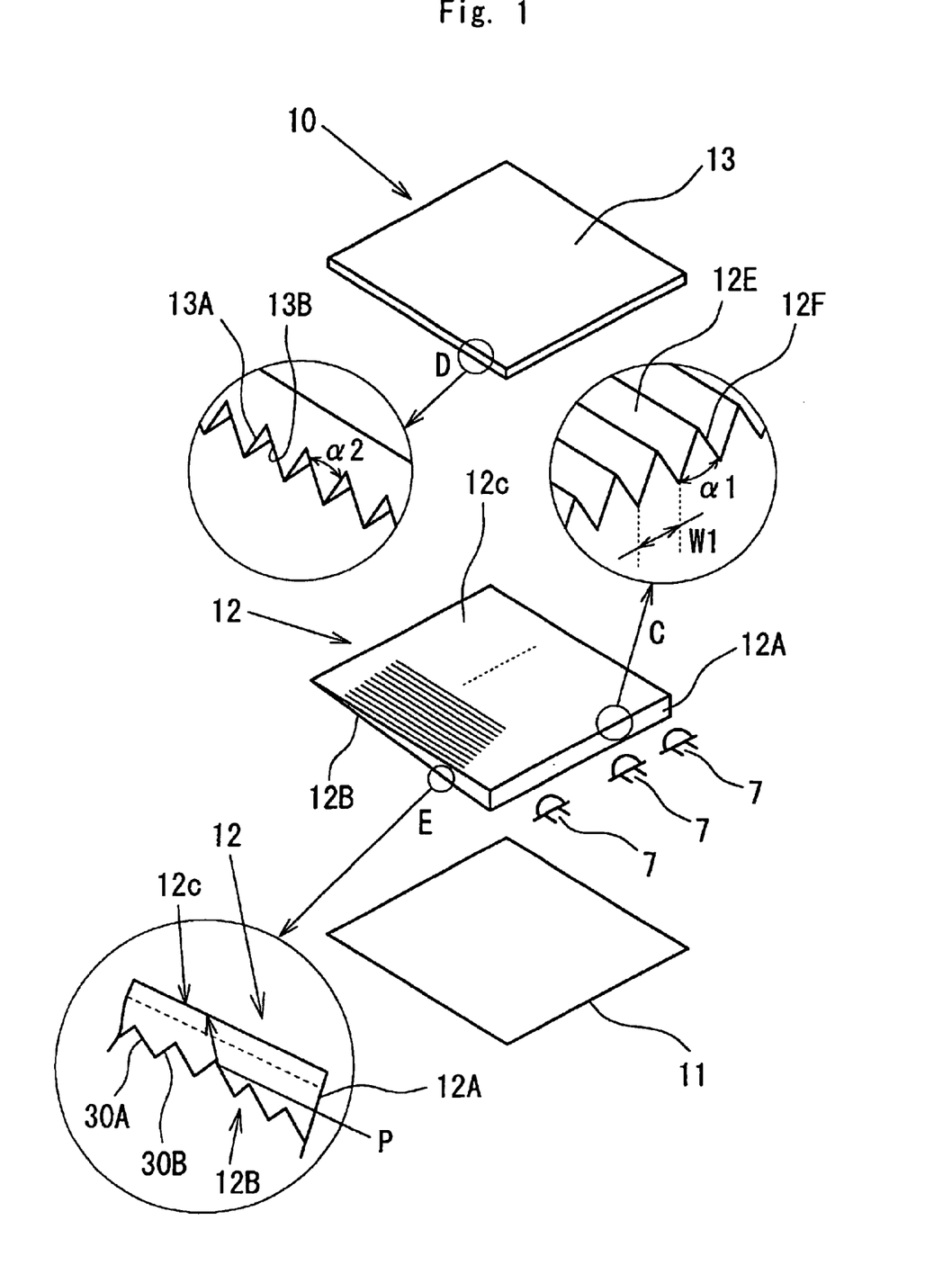
FIG. 1 is an exploded perspective view, including enlarged views of relevant areas, of a spread illuminating apparatus of side light system according to the present invention.
Figure 2A:
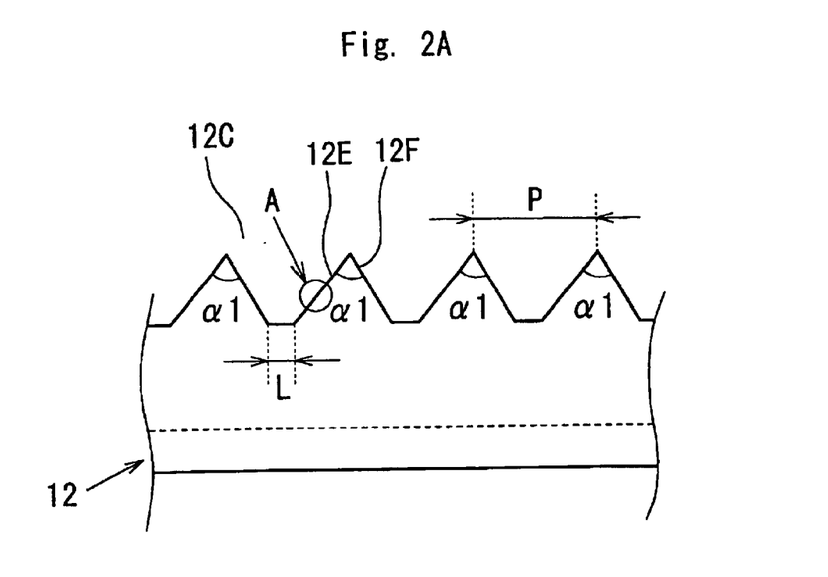
FIG. 2A is a partial cross-sectional view of a light conductive plate including a light scattering means according to a first embodiment of the present invention.

Referring to FIG. 1, a spread illuminating apparatus 10 generally comprises a reflector plate 11, a light conductive plate 12, a prism sheet 13, and a plurality of spot-like light sources (three LEDs in the figure) 7 disposed close to an entrance surface 12A of the light conductive plate 12. In this connection, a light scattering means (to be described later) formed on the light conductive plate 12 shown in FIG. 1 is an example of one embodiment shown in FIG. 2.

The reflector plate 11 is made of a sheet with a specular reflection material, for example a sheet evaporated with silver, thereby achieving a high reflectance for light emitted from the LEDs 7 so that light leaking from a bottom surface (inclined surface) 12B of the light conductive plate 12 can be efficiently brought back into the light conductive plate 12 resulting in improved usability of light. The light conductive plate 12 is made of a transparent resin and formed into a wedge shape in cross section. With this structure, light introduced into the light conductive plate 12 through the entrance surface 12A propagates with repeated reflections at the bottom surface 12B and a top surface (exit surface) 12C, during which some of the light exits through the exit surface 12C.

The light conductive plate 12 has the aforementioned light scattering means formed on the exit surface 12C. The light scattering means comprises, as shown in an enlarged view indicated by an arrow C, a plurality of paired slanting surfaces 12E and 12F extending in the direction perpendicular to the entrance surface 12A, and, in this embodiment, forming a triangular cross section. Light introduced in the light conductive plate 12 through the entrance surface 12A is refracted or reflected at the slanting surfaces 12E and 12F, and exits out with its directivity optimized for spread emission. The light conductive plate 12 of FIG. 1 is wedge-shaped in cross section, but may alternatively be shaped rectangular. Also, the LEDs 7 may emit either monochromatic or white light.

Further, the slanting surfaces 12E and 12F have a symmetrically identical inclination with respect to the exit surface 12C and are arranged to make an angle α1 of about 150 degrees in the light conductive plate 12 of FIG. 1 but may alternatively have respective inclinations different from each other and be so arranged as to set the angle α1 to be different from 150 degrees. The angle α1 may range from 50 to 160 degrees for achieving practical characteristics, preferably from 130 to 160 degrees. The angle α1 is appropriately determined depending on the number of spot-like light sources, the size of an LCD (not shown), the number of pixels, and the like. Also, the slanting surfaces 12E and 12F of the light scattering means define a pitch W1 preferably having a dimension equal to or smaller than three fourths of a pixel pitch of the LCD (not shown) used with the spread illuminating apparatus 10, for example, between 70 and 200 μm.

The light conductive plate 12 has an optical path conversion means formed on the bottom surface (inclined surface) 12B. The optical conversion means comprises, as shown in an enlarged view indicated by an arrow E, a plurality of paired slanting surfaces 30A and 30B extending in the direction parallel to the entrance surface 12A, and forming a triangular cross section, and light introduced in the light conductive plate 12 through the entrance surface 12A is reflected toward the exit surface 12C. The paired slanting surfaces 30A and 30B are conventionally structured. The inclinations of the slanting surfaces 30A and 30B are appropriately determined according to a desired exit angle of light exiting out through the exit surface 12C.

The prism sheet 13 has a plurality of minute prisms formed on its bottom surface facing the light conductive plate 12. The minute prisms are, as shown in an enlarged view indicated by an arrow D, arrayed in the direction perpendicular to the entrance surface 12A of the light conductive plate 12 and each comprise slanting surfaces 13A and 13B forming a triangular cross section and extending in the direction parallel to the entrance surface 12A.

Thus, the prism sheet 13 has the prisms arrayed orthogonally to the light scattering means of the light conductive plate 12, whereby light, which exits out through the exit surface 12C of the light conductive plate 12 slantingly toward a distal end of the light conductive plate 12 opposite to the entrance surface 12A and is introduced in the prism sheet 13 through the slanting surface 13A, is reflected at the slanting surface 13B to exit out the prism sheet 13 through its top surface in the upward direction, thus correcting the directivity of exiting light. In the prism sheet 13 of FIG. 1, the slanting surfaces 13A and 13B have a symmetrically identical inclination with respect to the top surface and are arranged to make an angle α2 of about 60 degrees but may alternatively have respective inclinations different from each other and be so arranged as to set the angle α2 to be different from 60 degrees. The angle α2 may range from 30 to 70 degrees for achieving practical characteristics, preferably from 50 to 70 degrees. Also, the slanting surfaces 13A and 13B define a pitch having a dimension equal to or smaller than three fourths of a pixel pitch of the LCD (not shown) used with the spread illuminating apparatus 10, for example, between 70 and 200 μm.

Figure 2B:
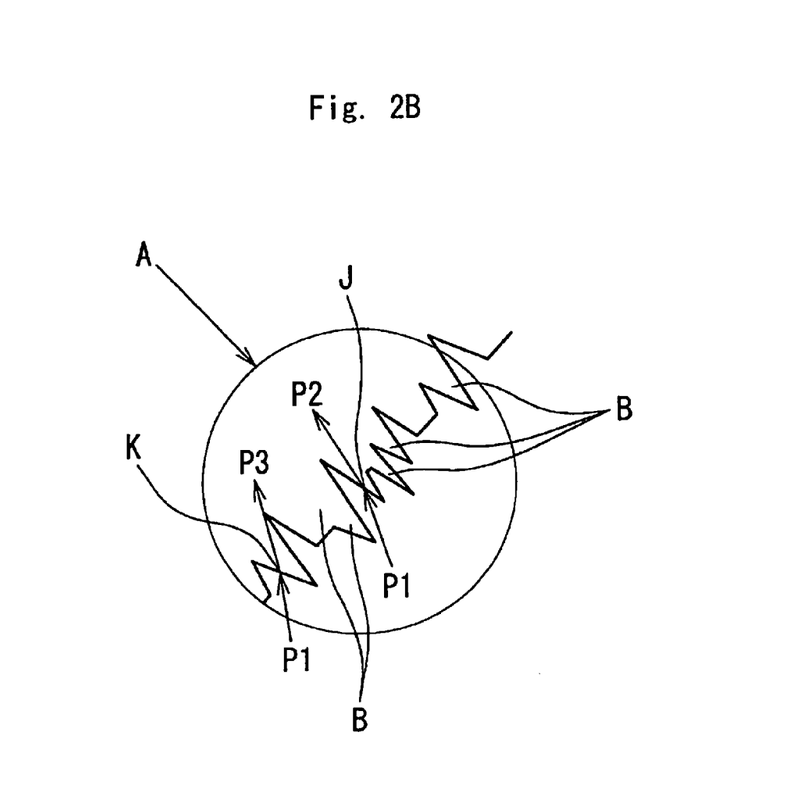
FIG. 2B is an enlarged view of a part encircled by a symbol A in FIG. 2A.

Referring now to FIGS. 2A and 2B, a first embodiment of a light scattering means formed on the light conductive plate 12 of FIG. 1 will hereinafter be explained. As shown in FIG. 2A, the light scattering means is formed on the exit surface 12C and comprises a plurality of paired slanting surfaces 12E and 12F extending in the direction perpendicular to the entrance surface 12A, forming a triangular cross section, and making an angle α1 equal to one another. A dimension L of a flat valley portion between adjacent paired slanting surfaces 12E and 12F is appropriately determined depending on a pitch P defined between respective peaks of two adjacent triangles each formed by the paired slanting surfaces 12E and 12F, and can be set at zero (0) as the case may be. The slanting surfaces 12E and 12F are roughened as described below. Specifically, as shown in FIG. 2B showing an enlarged view of a portion indicated by a circle A in FIG. 2A (FIG. 2B refers only to the slanting surface 12E for explanation purpose, but this is the case also with the slanting surface 12F), a plurality of grooves B shaped in V-letter in cross section and dimensioned differently from one another are formed so as to linearly extend in the direction parallel to the longitudinal direction of the surface 12E (12F) which extend in the direction perpendicular to the entrance surface 12A.

The grooves B are formed entirely on the surfaces 12E (12F) and have its depths and widths determined such that a center line average roughness Ra, taken out of the average surface roughness specified by JIS B 0601-1982, ranges preferably from 0.1 to 1.0 μm. The center line average roughness Ra is appropriately determined according to the size of the light conductive plate 12, the number of the LEDs 7, the size of pixels of the LCD (not shown), and the like. The grooves B are formed from a molding die for the light conductive plate 12, which has a groove pattern cut by a tool with the center line average roughness Ra described above.

In the light conductive plate 12 having the light scattering means configured as described above, light emitted from the LEDs 7 is introduced in the light conductive plate 12 through the entrance surface 12A, and propagates through the light conductive plate 12 while repeating reflections at the bottom surface 12B and the exit surface 12C. The light propagating through the light conductive plate 12 has its path changed by the slanting surfaces 12E and 12F formed on the exit surface 12C, has its incidence angle decreased with respect to the exit surface 12C each time when reflected at the bottom surface 12B which is inclined, and finally exits out through the exit surface 12C when the incidence angle is decreased to less than its critical angle. When the light propagating through the light conductive plate 12 exits out through the exit surface 12C, its exit angle in the direction parallel to the entrance surface 12A (lateral direction) is changed at the slanting surfaces 12E and 12F, and the light exits out substantially perpendicularly to the exit surface 12C. In this connection, light leaking through the bottom surface 12B is reflected by the reflector plate 11 and brought back into the light conductive plate 12 so as to be effectively utilized for illumination.

Though the slanting surfaces 12E and 12F without any work done thereon may be effective to some extent in improving uniformity in brightness entirely over the exit surface 12C, the uniformity achieved is not good enough because, for example, two bright lines radiating so as to spread from each of the LEDs 7 appear distinctly. It was found effective in eliminating the bright lines for improved uniformity in brightness over the light conductive plate 12 while maintaining a high luminance, that the slanting surfaces 12E and 12F are roughened with a plurality of V-shaped grooves extending in the direction parallel to the longitudinal dimension of the slanting surfaces 12E and 12F. When light propagating through the light conductive plate 12 exits out through the exit surface 12C, the slanting surfaces 12E and 12F thus roughened allow the exiting angle of light to be diffused with respect to the direction parallel to the entrance surface 12A. Specifically, as shown schematically in FIG. 2B, two light rays P1 propagating in parallel to each other through the light conductive plate 12, when exiting out therefrom, have their respective paths changed differently in the lateral direction because their respective incidence angles are different from each other due to the slanting surface 12E (12F) roughened with the plurality of grooves B. For example, one light ray P1 incident on a point J exits out as a light ray P2, and the other light ray P1 propagating in parallel to the one light ray P1 and incident on a point K exits out as a light ray P3 propagating in a different direction from the light ray P2, whereby the optical directivity is lowered, and therefore the uniformity in brightness of light over the light conductive plate 12 is improved. As far as the direction perpendicular to the entrance surface 12A is concerned, it does not have impact on the optical path whether or not the slanting surface 12E (12F) is roughened with the grooves B, and therefore the optical directivity is not lowered maintaining a high luminance.

The angles α1 made by respective paired slanting surfaces 12E and 12F are set equal to one another in the light scattering means discussed above but may alternatively be set different from one another when the slanting surfaces 12E and 12F are not roughened. This means that all slanting surfaces 12E and 12F have respective inclinations different from one another, which generates an effect similar to that achieved by the grooves B. In this connection, the angles α1 do not have to be set different entirely from one another, but alternatively at least three consecutive angles α1 as a unit may be set different from one another and the unit is arranged in series. Further, the slanting surfaces 12E and 12F may be roughened with the grooves B as described above while the angles α1 made by the respective paired slanting surfaces 12E and 12F are set different from one another. This is effective in further lowering the optical directivity, thus resulting in illuminating the LCD more uniformly.

Figure 3A:
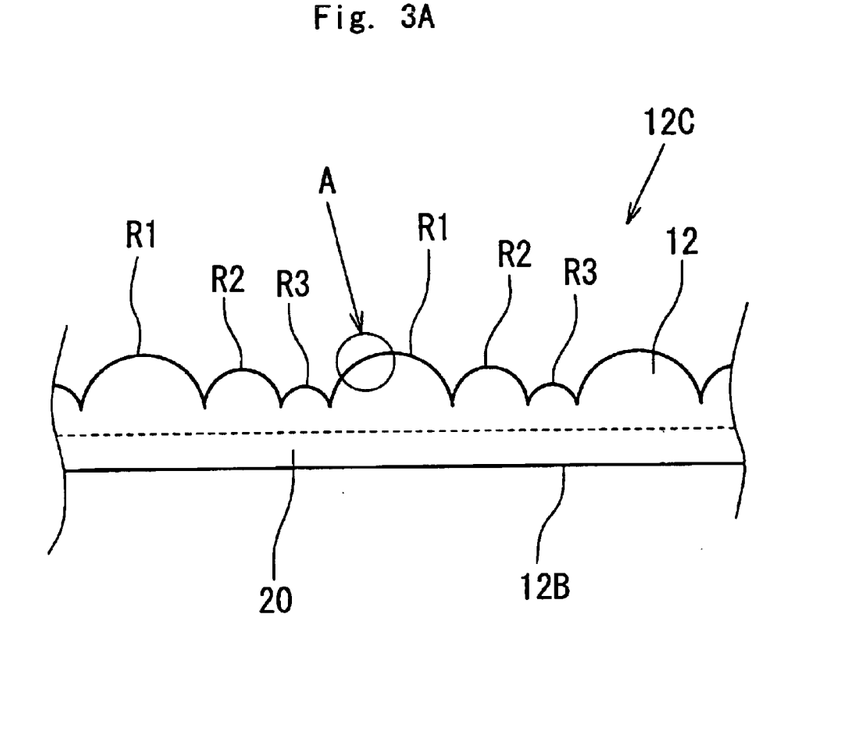
FIG. 3A is a partial cross-sectional view of a light conductive plate including a light scattering means according to a second embodiment of the present invention.
Figure 3B:
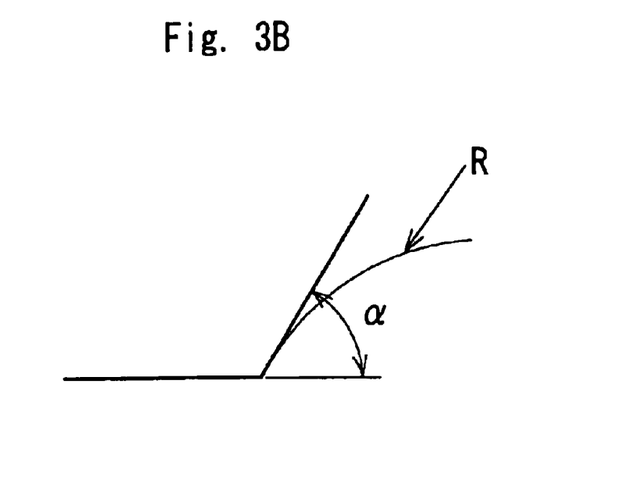
FIG. 3B is an explanatory cross-sectional view of an arced surface.

A second embodiment of a light scattering means formed on the light conductive plate 12 will now be explained with reference to FIGS. 3A to 3C. Referring to FIG. 3A, the light conductive plate 12 has a plurality of ridges R formed on the exit surface 12C. The ridges R include a plurality of kinds (three kinds R1 to R3 in the figure) with different dimensions, have their surfaces arced in cross section and extend in a direction perpendicular to the entrance surface 12A, through which light emitted from the LEDs is introduced. The ridges R1 to R3 have their arced surfaces not provided with grooves, such as the grooves B described above, and have respective tangential angles α with respect to the imaginary major plane of the light conductive plate 12 (see FIG. 3B) differing from one another. The tangential angles α are each preferably set to range from 10 and 50 degrees and to differ from one another. The difference in the tangential angles α produces an effect similar to that achieved by the grooves B in the first embodiment. Specifically, the difference in the tangential angles α causes light to be scattered with respect to the lateral direction. Consequently, the optical directivity in the lateral direction is lowered so that the light exits out from the light conductive plate 12 in a substantially uniform manner and therefore irradiates the LCD uniformly.

Figure 3C:
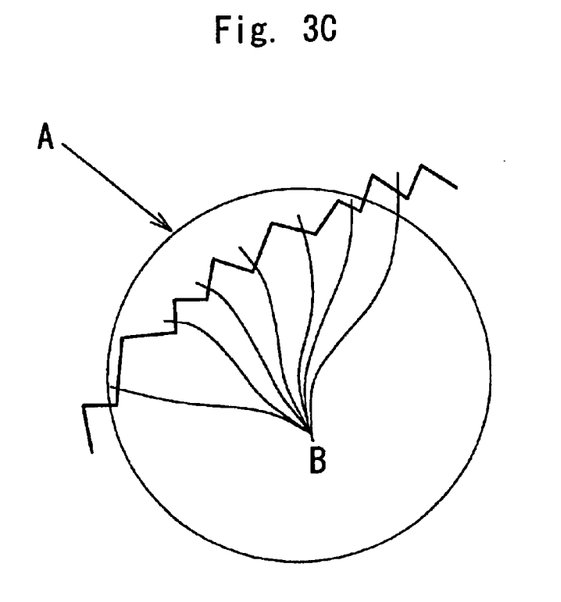
FIG. 3C is an enlarged view of a part encircled by a symbol A in FIG. 3A.

The ridges R are provided in three kinds R1 to R3 having respective dimensions and respective tangential angles α different from one another in FIG. 3A but may alternatively be provided in different number of kinds having respective tangential angles α different from one another. The arced ridges R with different tangential angles α are formed from a molding die for the light conductive plate, which has a ridge pattern cut such that a tool with an arced tip is set at different depths according to the dimensions of respective ridges. Further, as shown in FIG. 3C, the arced surfaces of the ridges R may be roughened with a plurality of grooves like the grooves B. With this configuration, the optical directivity is further lowered, and therefore light exits out from the light conductive plate 12 in a more uniform manner and irradiates the LCD more uniformly. The grooves can be formed by the method described in the discussion of the first embodiment.

A third embodiment of a light scattering means formed on the light conductive plate 12 will hereinafter be explained with reference to FIG. 4. The light conductive plate 12 has a plurality of ridges B formed on the exit surface 12C. The ridges include a plurality of kinds (three kinds B1 to B3 in FIG. 4) with different dimensions and are each multifaceted forming a polygonal cross section and extend in the direction perpendicular to the entrance surface 12A. The difference in dimension and the difference in gradient angles (θ1, θ2, and so forth), separately or in combination, produce an effect similar to that achieved by the grooves B in the first embodiment, thus causing light to be scattered with respect to the lateral direction. Consequently, the optical directivity is lowered and the light exits out from the light conductive plate 12 in a substantially uniform manner and irradiates the LCD uniformly.

Figure 4:
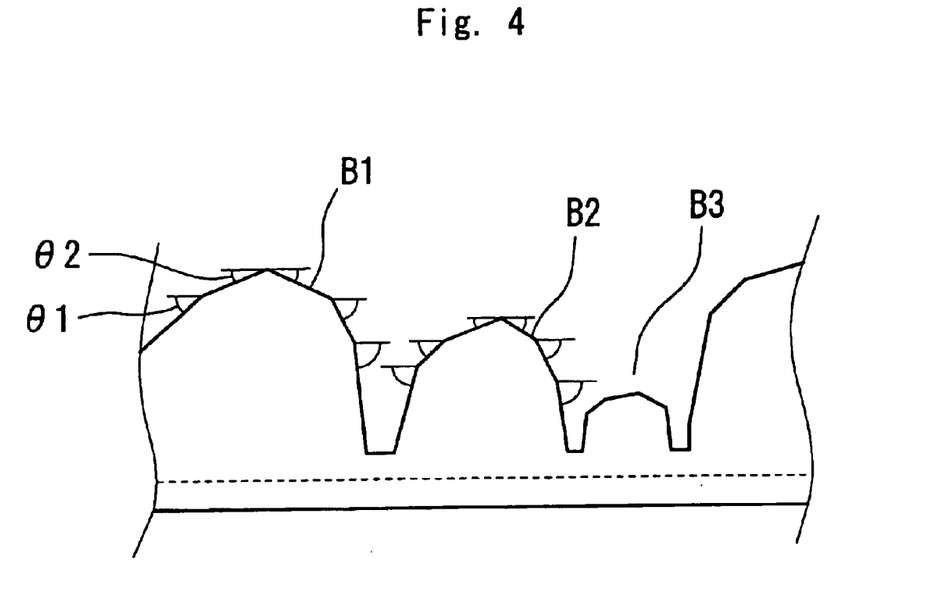
FIG. 4 is a partial cross-sectional view of a light conductive plate including a light scattering means according to a third embodiment of the present invention.

The ridges B are provided in three kinds B1 to B3 having respective dimensions and respective gradient angles different from one another as shown in FIG. 4 but may alternatively be provided in a different number of kinds. Further, the multifaceted surfaces of the ridges B may be roughened with a plurality of grooves like the grooves B. With this configuration, the optical directivity is further lowered, and therefore light exits out from the light conductive plate 12 in a more uniform manner and irradiates the LCD more uniformly.

All the light scattering means discussed above are formed in such a manner as to protrude from the exit surface 12C of the light conductive plate 12 but may alternatively be formed in such a manner as to cave therein with symmetrical patterns.

Many different embodiments of the present invention may be constructed without departing from the spirit and scope of the invention. It should be understood that the present invention is not limited to the specific embodiments described in this specification but is intended to cover various modifications and equivalent arrangements included within the spirit and scope of the appended claims.

What is claimed is:

1. A spread illuminating apparatus comprising:
   at least one spot-like light source; and
   a light conductive plate, which has the at least one spot-like light source disposed close to its light entrance surface, and which allows light emitted from the at least one spot-like light source and introduced therein through the light entrance surface to exit through its light exit surface toward an object to be illuminated, wherein the light exit surface is provided with a light scattering means comprising a plurality of mechanisms which are each formed so as to be oriented in a direction perpendicular to the light entrance surface and to be continuously arrayed along the light entrance surface, and which are adapted to scatter the light emitted from the at least one spot-like light source with respect to a direction parallel to the light entrance surface, and wherein a surface of the light conductive plate opposite to the light exit surface is provided with an optical path conversion means comprising a plurality of paired slanting surfaces which are formed so as to be oriented in the direction parallel to the light entrance surface.

2. A spread illuminating apparatus according to claim 1, wherein the mechanisms of the light scattering means each comprise paired slanting surfaces forming a triangular cross section, and have their respective triangular cross sections defining respective apex angles different from one another.

3. A spread illuminating apparatus according to claim 1, wherein the mechanisms of the light scattering means each comprise a ridge having its surface arced in cross section, and have their respective ridges differing in dimension and defining different maximum tangential angles with respect to an imaginary major plane of the light conductive plate.

4. A spread illuminating apparatus according to claim 3, wherein the maximum tangential angles range from 10 to 50 degrees.

5. A spread illuminating apparatus according to claim 1, wherein the mechanisms of the light scattering means each comprise a ridge multifaceted so as to form a polygonal cross section, and have their respective ridges differing in dimension and in cross sectional configuration.

6. A spread illuminating apparatus according to claim 1, wherein the mechanisms of the light scattering means have their surfaces roughened with a plurality of grooves each formed so as to extend in the direction perpendicular to the light entrance surface of the light conductive plate.

7. A spread illuminating apparatus according to claim 1, wherein the mechanisms of the light scattering means each comprise paired slanting surfaces forming a triangular cross section, and have their respective triangular cross sections defining respective apex angles equal to one another, and the slanting surfaces are roughened with a plurality of grooves each formed so as to extend in the direction perpendicular to the light entrance surface of the light conductive plate.

8. A spread illuminating apparatus according to claims 6, wherein the surfaces roughened have an average surface roughness ranging from 0.1 to 1.0 $\mu$m.

9. A spread illuminating apparatus according to claim 2, wherein the mechanisms of the light scattering means have their surfaces roughened with a plurality of grooves each formed so as to extend in the direction perpendicular to the light entrance surface of the light conductive plate.

10. A spread illuminating apparatus according to claim 3, wherein the mechanisms of the light scattering means have their surfaces roughened with a plurality of grooves each formed so as to extend in the direction perpendicular to the light entrance surface of the light conductive plate.

11. A spread illuminating apparatus according to claim 4, wherein the mechanisms of the light scattering means have their surfaces roughened with a plurality of grooves each formed so as to extend in the direction perpendicular to the light entrance surface of the light conductive plate.

12. A spread illuminating apparatus according to claim 5, wherein the mechanisms of the light scattering means have their surfaces roughened with a plurality of grooves each formed so as to extend in the direction perpendicular to the light entrance surface of the light conductive plate.

13. A spread illuminating apparatus according to claim 7, wherein the surfaces roughened have an average surface roughness ranging from 0.1 to 1.0 $\mu$m.

* * * * *